June 19, 1962 F. G. SIEGEL 3,040,206
CATHODE RAY TUBE BEAM FINDER CIRCUIT
Filed Nov. 4, 1959
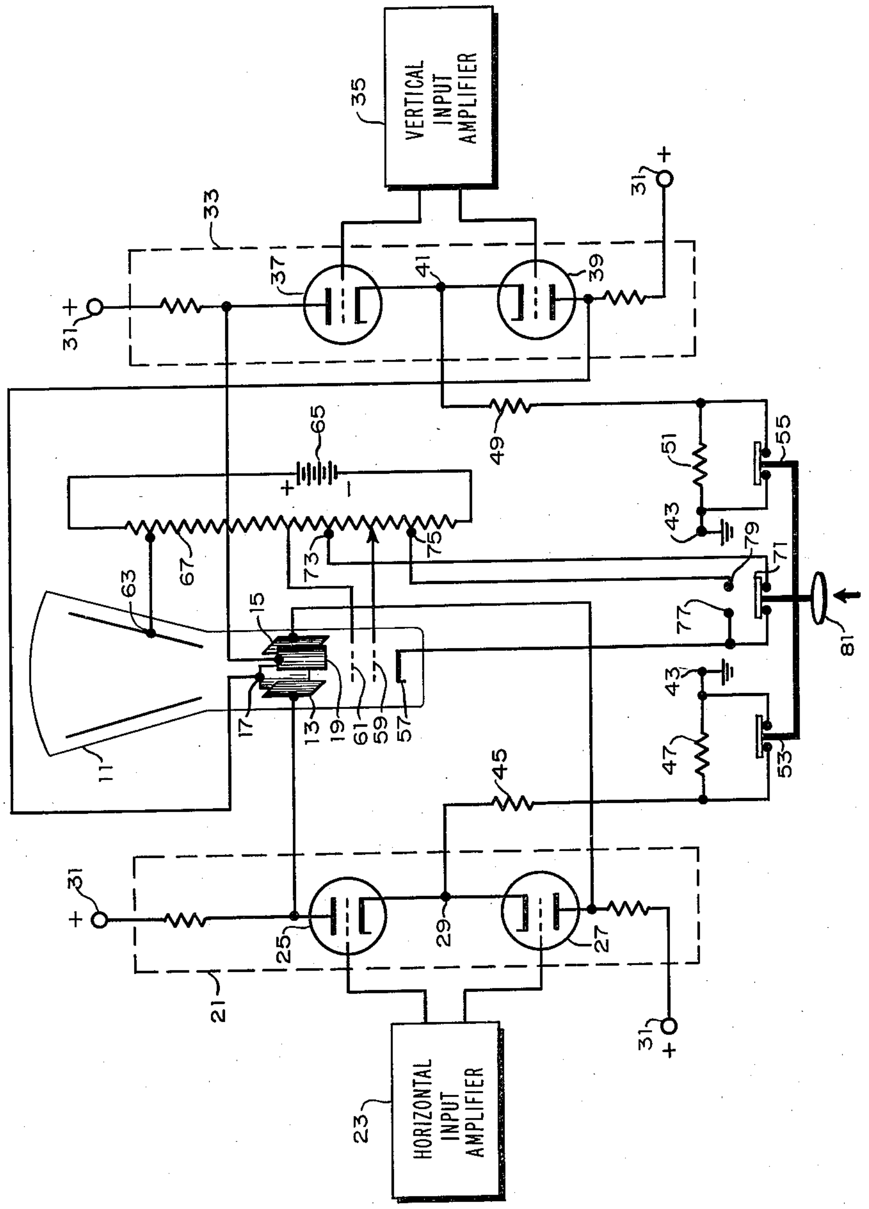
INVENTOR
FLOYD G. SIEGEL
BY [signature]
ATTORNEY United States Patent Office 3,040,206

Patented June 19, 1962

3,040,206

CATHODE RAY TUBE BEAM FINDER CIRCUIT

Floyd G. Siegel, Mountain View, Calif., assignor to Hewlett-Packard Company, Palo Alto, Calif., a corporation of California Filed Nov. 4, 1959, Ser. No. 850,924
4 Claims. (Cl. 315—22)

This invention relates to cathode-ray oscilloscopes.

When deflection signals above a certain level are applied to a cathode-ray tube, the beam spot may be deflected off the face of the tube. Unless means are provided to indicate the direction in which the beam is over-deflected, the operator does not know in which direction he should adjust the deflection controls to bring the beam back onto the face of the tube. I have disclosed a beam finder circuit in my copending U.S. patent application, Serial No. 769,369, filed October 24, 1959, now issued as U.S. Patent 2,963,618. This beam finder circuit reduces the gain of the horizontal and vertical amplifiers thus bringing the beam back on the face of the tube if it is over-deflected. This gain reduction is accomplished without affecting the high-frequency performance of the oscilloscope.

Bringing back the beam on the face of the tube, however, provides no indication unless the beam is visible. The beam may be invisible because the beam intensity control is set too low.

The main object of this invention is to provide a beam finder circuit which, when actuated, not only brings the beam back on to the face of the tube, but also increases the beam intensity so as to make sure that it will be visible to the operator.

Other objects of this invention will appear from a reading of this specification and an inspection of the accompanying drawing which shows a schematic diagram of an embodiment of this invention.

Referring now to the drawing there is shown a cathode ray tube 11 having horizontal deflection plates 13 and 15 and vertical deflection plates 17 and 19. The horizontal deflection plates 13 and 15 are connected to a horizontal output amplifier 21 which obtains its signal from a horizontal input amplifier 23. The horizontal output amplifier 21 comprises two vacuum tube sections 25 and 27 the cathodes of which are tied together at junction point 29 and the anodes of which are connected through load resistors to the positive power supply terminal 31. Similarly, the vertical deflection plates 17 and 19 are driven by a vertical output amplifier 33 which obtains its signal from a vertical input amplifier 35. The vertical output amplifier 33 comprises two tube sections 37 and 39 the cathodes of which are tied together at junction point 41 and the anodes of which are connected through resistors to the positive power supply terminal 31.

The junction point 29 of the cathodes of the horizontal output amplifier 21 and the junction point 41 of the cathodes of the vertical output amplifier 33 are each connected to the negative power supply terminal 43 through pairs of series connected resistors 45, 47 and 49, 51. The resistors 47 and 51 are normally shunted by means of push-button beam finder switch means 53 and 55.

The cathode ray tube 11 is provided with an electron gun comprising a cathode 57, a control electrode 59, a first anode 61 and a second anode 63. The electron gun is provided wth suitable operating potentials from a direct current source such as battery 65 and a voltage dividing resistor 67 connected across source 65. The cathode 57 is normally connected, through push-button beam finder switch means 71, to point 73 on resistor 67. When actuated, the switch means 71 disconnect the cathode 57 from point 73 and connects it to point 75 through contacts 77 and 79. The three switching means 53, 55 and 71 are operated simultaneously by means of push-button 81.

The operation of the beam-finder circuit shown in the drawing is as follows: the push-button beam finder switch means 53 and 55 are normally closed so that the only resistor in the cathode circuit of the horizontal output amplifier 21 is resistor 45 and the only resistor in the cathode circuit of the vertical output amplifier 33 is resistor 49. When the push-button beam finder switch is actuated the additional resistor 47 and 51 are placed in series with the cathode resistors 45 and 49 respectively. This limits the current in the cathode circuit of the amplifiers 21 and 33, and therefore limits the voltage across the horizontal and vertical deflection plates of the cathode ray tube 11. By choosing the proper values of resistances these voltages may be limited sufficiently to bring the beam spot back onto the face of the tube. If the beam is over-deflected upwards and to the right, actuation of the beam finder push-button switch 53 will bring the beam spot back onto the upper right hand quadrant of the cathode ray tube face. At the same time, actuation of the beam finder switch means 71 changes the potential at the cathode 57 from that at point 73 to that at point 75. This increases the brightness of the cathode ray beam and makes sure that the beam spot will be visible to the operator. The operator will then know how to adjust his controls to have the beam spot on the face of the tube under normal operating conditions.

I claim:

1. In a cathode-ray oscilloscope, a cathode-ray tube having means to produce a beam, a pair of horizontal deflection plates and a pair of vertical deflection plates, means to supply a voltage including a direct-current component across said horizontal deflection plates, means to supply a voltage including a direct-current component across the vertical deflection plates, beam-finder switching means including first and second circuits, means including the first circuit of said beam-finder switching means and responsive to the actuation of said switching means to reduce simultaneously the direct-current components of the voltages across said pairs of deflection plates, and means including the second circuit of said beam-finder switching means and responsive to the actuation of said switching means to increase the intensity of said beam simultaneously with the reduction of said voltages across said pairs of deflection plates.

2. In a cathode-ray oscilloscope, a cathode-ray tube having means to produce a beam, a pair of horizontal deflection plates and a pair of vertical deflection plates, a horizontal amplifier having anode and cathode circuits, a vertical amplifier having anode and cathode circuits, signal and direct-current conducting means to connect the output of said horizontal amplifier to said horizontal deflection plates, signal and direct-current conducting means to connect the output of said vertical amplifier to said vertical deflection plates, beam-finder switching means including first and second circuits, means including the first circuit of said beam-finder switching means and responsive to the actuation of said switching means to connect simultaneously additional series resistance in the cathode circuit of each of said amplifiers, and means including the second circuit of said beam-finder switching means and responsive to the actuation of said switching means to increase the intensity of said beam simultaneously with said connection of additional resistance in said cathode circuits.

3. In a cathode-ray oscilloscope, a cathode-ray tube having means to produce a beam, a pair of horizontal deflection plates and a pair of vertical deflection plates, means to supply a voltage including a direct-current component across said horizontal deflection plates, means to supply a voltage including a direct-current component across the vertical deflection plates, beam-finder switching means including first and second circuits, said switching means being manually actuatable and automatically releasable, means including the first circuit of said beam-finder switching means and responsive to the actuation of said switching means to reduce simultaneously the direct-current components of the voltages across said pairs of deflection plates, and means including the second circuit of said beam-finder switching means and responsive to the actuation of said switching means to increase the intensity of said beam simultaneously with the reduction of said voltages across said pairs of deflection plates.

4. In a cathode-ray oscilloscope, a cathode-ray tube having means to produce a beam, a pair of horizontal deflection plates and a pair of vertical deflection plates, a horizontal amplifier having anode and cathode circuits, a vertical amplifier having anode and cathode circuits, signal and direct-current conducting means to connect the output of said horizontal amplifier to said horizontal deflection plates, signal and direct-current conducting means to connect the output of said vertical amplifier to said vertical deflection plates, beam-finder switching means including first and second circuits, said switching means being manually actuatable and automatically releasable, means including the first circuit of said beam-finder switching means and responsive to the actuation of said switching means to connect simultaneously additional series resistance in the cathode circuit of each of said amplifiers, and means including the second circuit of said beam-finder switching means and responsive to the actuation of said switching means to increase the intensity of said beam simultaneously with said connection of additional resistance in said cathode circuits.

References Cited in the file of this patent

UNITED STATES PATENTS

| | | |
|---|---|---|
| 2,078,644 | Swedlund | Apr. 27, 1937 |
| 2,153,140 | Diehl | Apr. 4, 1939 |
| 2,168,566 | Goldsmith | Aug. 8, 1939 |
| 2,226,230 | Linsell | Dec. 24, 1940 |
| 2,310,671 | Batchelor | Feb. 9, 1943 |
| 2,418,133 | Miller | Apr. 1, 1947 |
| 2,963,618 | Siegel | Dec. 6, 1960 |